United States Patent [19]

McNutt et al.

[11] 4,231,074
[45] Oct. 28, 1980

[54] ZERO SEQUENCE CURRENT SOURCE FOR TRANSFORMER HAVING A NONWOUND TERTIARY

[75] Inventors: William J. McNutt, Pittsfield, Mass.; James R. Wilson, Cincinnati, Ohio

[73] Assignee: General Electric Company, N.Y.

[21] Appl. No.: 943,235

[22] Filed: Sep. 18, 1978

[51] Int. Cl.³ .................. H02H 3/08; H02H 7/04
[52] U.S. Cl. ........................ 361/44; 324/86; 324/108; 336/84 C; 361/35
[58] Field of Search ............ 361/44, 47, 42, 35, 361/36, 38; 336/5, 10, 12, 214, 175, 84 R, 84 C, 87; 324/86, 107, 108; 174/35

[56] References Cited

U.S. PATENT DOCUMENTS

| 1,746,629 | 2/1930 | Bernarde | 361/36 |
| 3,315,129 | 4/1967 | Fisher | 361/47 |
| 3,546,358 | 12/1970 | Pohl | 336/84 X |
| 3,624,499 | 11/1971 | Smith et al. | 361/35 X |
| 3,827,018 | 7/1974 | Thomas et al. | 336/84 C |
| 3,863,109 | 1/1975 | Emanuel et al. | 361/35 |

Primary Examiner—Patrick R. Salce
Attorney, Agent, or Firm—Francis X. Doyle; Richard A. Menelly

[57] ABSTRACT

A three-phase electrical transformer utilizes a conductor independent of the transformer windings for sensing zero sequence current upon the occurrence of a ground fault. A current transformer coupled with the independent conductor provides polarization to protective relay devices. One embodiment utilizes the transformer internal tank shield in combination with the current transformer for providing zero sequence current.

12 Claims, 3 Drawing Figures

ZERO SEQUENCE CURRENT SOURCE FOR TRANSFORMER HAVING A NONWOUND TERTIARY

BACKGROUND OF THE INVENTION

Transformers are currently available which include auxiliary windings and sensing coils for sensing the occurrence of a ground fault condition and for providing indication that a fault has occurred. U.S. Pat. No. 3,624,499 discloses the use of transformers having auxiliary sensing equipment for indicating the occurrence of a ground fault condition and for activating a protective relay.

When a fault to ground occurs in a three-phase power system, its presence is signalled by the flow of zero sequence current through the power system and its connected apparatus. Protective relays are available which are capable of distinguishing the presence of the ground fault and triggering corrective action to isolate the affected portion of the system when supplied with a measure of the zero sequence current that is present. One of the most accessible locations for sensing zero sequence current is in a delta-connected winding of a three-phase power transformer where a major component of the current circulates. The usual practice is to position an iron core current transformer so that its core surrounds the delta-connected winding phase lead. A measure of the zero sequence current can be taken from the current transformer secondary winding. An alternative location for sensing the flow of zero sequence current is in a grounded neutral connection of a wye-connected transformer winding, if one exists.

Autotransformers are commonly used in power systems, for system voltages of 115 kV and above. In autotransformers the common ground point connection for the two principal windings is not a suitable measuring point of zero sequence current, since ground fault currents from both primary and secondary voltage systems will flow through the same point. In most such situations a delta-connected tertiary winding is usually available to provide the zero sequence current measurement source.

When autotransformers are used in high voltage substations and are constructed on a three-legged core, the transformer delta-connected tertiary winding can be eliminated for cost saving purposes. Since the tertiary winding is usually employed for providing a source of polarizing (zero sequence) current for ground fault protection relays, some means must be employed for providing the necessary zero sequence current.

The purpose of this invention is to provide a means for sensing zero sequence current in autotransformers not containing a tertiary winding for the purpose of polarizing transmission line protective relays upon the occurrence of a ground fault.

SUMMARY OF THE INVENTION

Autotransformers not containing tertiary windings employ an auxiliary conductor in magnetic relation with the transformer core in which zero sequence current is induced upon the occurrence of a ground fault. A current transformer coupled with the auxiliary conductor senses the zero sequence current for protective relay activation. The auxiliary conductor must be arranged interior to the transformer tank wall. With transformers containing an internal conducting shield arrangement the shield can be adapted to serve as the internal conductor.

DESCRIPTION OF THE PREFERRED EMBODIMENT

Figure 1:
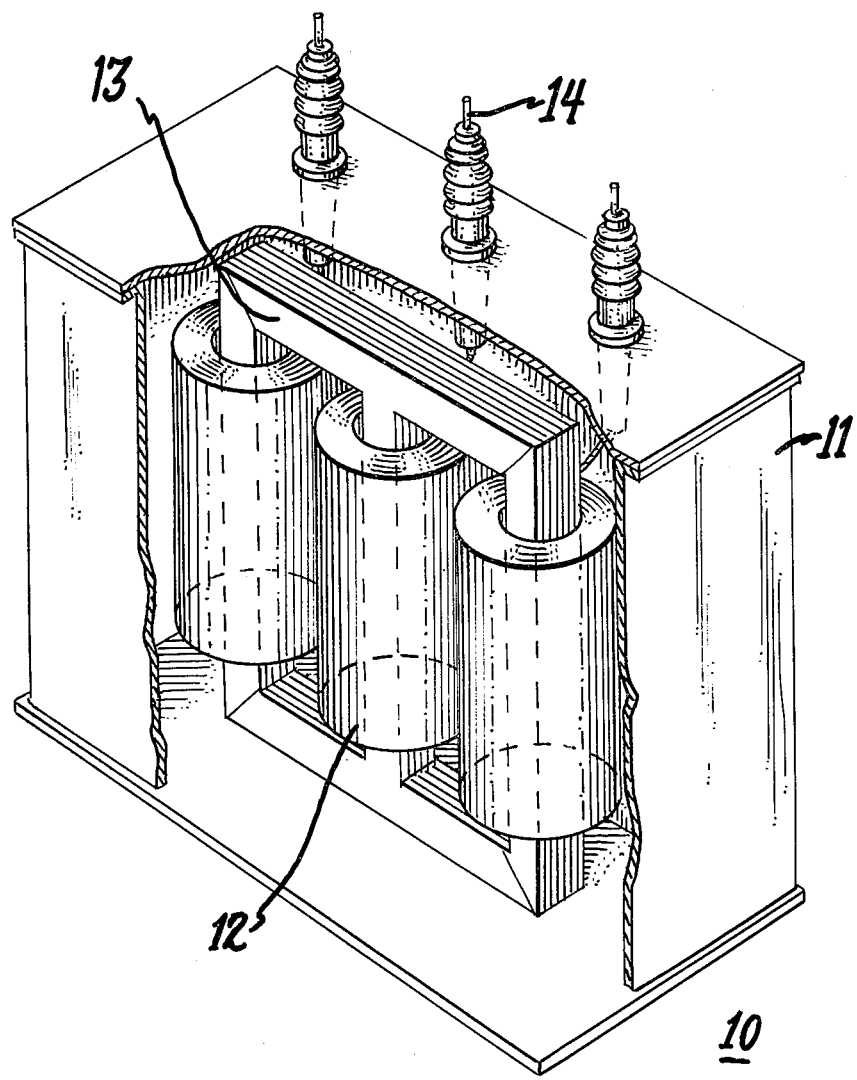
FIG. 1 is a cutaway front perspective view of an autotransformer of the type for use with the zero sequence current conductor according to the invention.

This invention finds application within a three-phase core form transformer 10, shown in FIG. 1, containing a transformer casing 11 which encloses three sets of transformer windings 12 around a corresponding three-legged transformer core 13. Electrical connection is made with the windings by means of a plurality of bushings 14 connecting through the transformer casing.

Figure 2:
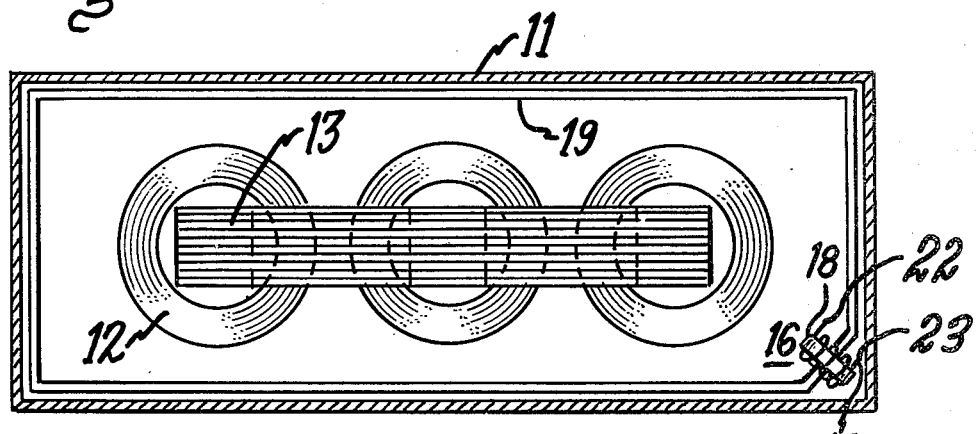
FIG. 2 is a top view of a transformer containing an internal auxiliary conductor and current transformer arrangement according to the invention.

FIG. 2 shows a preferred arrangement wherein an internally-mounted auxiliary conductor 19 surrounds the core 13 and windings 12 within casing 11. Upon the occurrence of an external ground fault the leakage flux produced by zero sequence currents in the windings 12 induces a zero sequence current in the auxiliary conductor 19. The auxiliary conductor current can be sensed by means of a current transformer 16 consisting of many individual wire turns 17, terminals 22 and 23 on a small core 18. The current transformer signal can be conducted to the protective relays external to the casing 11 through small bushings (not shown), for sensing the zero sequence current.

Figure 3:
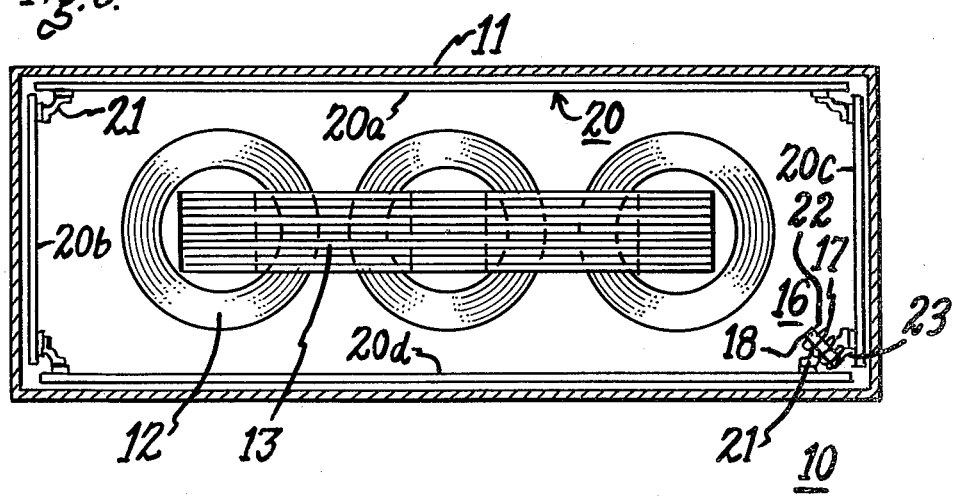
FIG. 3 is a top view of a further arrangement of a transformer with the internal tank wall shield arranged for zero sequence current sensing according to the invention.

FIG. 3 shows a further embodiment for employing zero sequence current for ground relay polarization. Transformer 10 is of the type containing an interior conducting shield 20 which covers a substantial portion of the vertical walls of the casing to protect said casing walls from the impact of electromagnetic flux emanating from the windings. A plurality of connectors 21 electrically connect between the four shield segments, 20a—20d, in order to make the shield a continuous electrical conductor which is capable of operating in a manner similar to conductor 19 of FIG. 2. A current transformer 16 consisting of several wire turns 17 on a small core 18 is arranged around at least one of the connectors 21 which are conveniently provided at each corner of the casing. The arrangement of current transformer 16 in the corner of the casing provides no unnecessary added structure and realizes only a slight expenditure in overall transformer cost.

Shield 20 of FIG. 3 generally consists of a heavy aluminum plate which readily conducts electricity upon the occurrence of a ground fault by intercepting the zero sequence flux generated within core 13 and windings 12 as described earlier.

Although the zero sequence current arrangements of the invention are described for use with high voltage substation transformers, this is by way of example only. The zero sequence current arrangement of the invention finds application wherever zero sequence currents are required for transmission line protective relay polarization.

We claim:

1. A zero sequence current source for use with transformers comprising:
   a nontertiary autotransformer within a casing and having primary and secondary windings arranged around a core;
   an auxiliary conductor within the transformer proximate said casing and surrounding both said core and said windings for intercepting zero sequence flux from the core and the windings during an external ground fault occurrence; and
   a current transformer surrounding a part of the auxiliary conductor for sensing zero sequence current.

2. The zero sequence current source of claim 1 wherein the transformer is a nontertiary autotransformer.

3. The zero sequence current source of claim 1 wherein the auxiliary conductor is located in magnetic proximity to the core.

4. The zero sequence current source of claim 3 wherein the conductor comprises at least one turn.

5. The zero sequence current source of claim 1 wherein the current transformer comprises at least one turn of wire.

6. The zero sequence current source of claim 5 wherein the current transformer further includes a pair of terminals for connecting with a ground fault relay.

7. The zero sequence current source of claim 6 wherein the current transformer is provided concentrically around the conductor at a corner of the casing.

8. A zero sequence current source for use with transformers of the type consisting of a three-legged core and primary and secondary wye-connected windings arranged around the legs of the core within a casing and an electrically conducting shield within the casing comprising:
   a current transformer in magnetic proximity with the shield for inducing zero sequence current within the current transformer during a ground fault condition.

9. The zero sequence current source of claim 8 wherein the current transformer comprises at least one turn of wire and a pair of terminals connected with the wire for coupling with a ground fault relay.

10. The zero sequence current source of claim 9 wherein the current transformer is situated proximate a corner of the transformer casing.

11. The zero sequence current source of claim 10 further including an electrical connector at each corner of the casing for electrically connecting between individual shield sections.

12. The zero sequence current source of claim 11 wherein the current transformer is provided around at least one of the shield connectors.

* * * * *